United States Patent
Hsu et al.

(10) Patent No.: US 9,001,026 B2
(45) Date of Patent: Apr. 7, 2015

(54) ELECTROPHORETIC PANEL AND DRIVING METHOD THEREOF

(75) Inventors: Kuo-Cheng Hsu, Hsin-Chu (TW); Che-Chia Hsu, Hsin-Chu (TW); Pei-Yu Chen, Hsin-Chu (TW); Kuo-Hsing Cheng, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 230 days.

(21) Appl. No.: 13/429,432

(22) Filed: Mar. 25, 2012

(65) Prior Publication Data
US 2012/0280952 A1 Nov. 8, 2012

(30) Foreign Application Priority Data

May 2, 2011 (TW) .............................. 100115341 A

(51) Int. Cl.
G09G 3/34 (2006.01)
G02F 1/1362 (2006.01)
G02F 1/167 (2006.01)

(52) U.S. Cl.
CPC .......... *G09G 3/344* (2013.01); *G02F 1/136286* (2013.01); *G02F 1/167* (2013.01); *G09G 2310/0267* (2013.01); *G09G 2310/04* (2013.01)

(58) Field of Classification Search
CPC ................................. G09G 3/344; G02F 1/167
USPC ........................................................ 345/107
See application file for complete search history.

(56) References Cited

U.S. PATENT DOCUMENTS

| | | | | |
|---|---|---|---|---|
| 5,818,413 A | * | 10/1998 | Hayashi et al. | 345/100 |
| 2001/0052887 A1 | * | 12/2001 | Tsutsui et al. | 345/87 |
| 2002/0190944 A1 | * | 12/2002 | Morita | 345/100 |
| 2004/0263452 A1 | * | 12/2004 | Kim | 345/87 |
| 2005/0156861 A1 | * | 7/2005 | Song | 345/100 |
| 2005/0179679 A1 | | 8/2005 | Hosaka et al. | |
| 2006/0028421 A1 | * | 2/2006 | Nakamura et al. | 345/99 |
| 2006/0208992 A1 | * | 9/2006 | Akutsu et al. | 345/98 |
| 2008/0224992 A1 | * | 9/2008 | Kim et al. | 345/107 |
| 2009/0040168 A1 | * | 2/2009 | Liu | 345/100 |
| 2009/0174640 A1 | * | 7/2009 | Nose et al. | 345/88 |
| 2009/0189849 A1 | | 7/2009 | Miyazaki et al. | |
| 2011/0261031 A1 | * | 10/2011 | Muto | 345/204 |
| 2012/0139963 A1 | * | 6/2012 | Lee et al. | 345/690 |

FOREIGN PATENT DOCUMENTS

| | | |
|---|---|---|
| TW | 200601224 | 1/2006 |
| TW | 200907909 | 2/2009 |
| TW | 200949792 | 12/2009 |

\* cited by examiner

*Primary Examiner* — Claire X Pappas
*Assistant Examiner* — Robert Stone
(74) *Attorney, Agent, or Firm* — Winston Hsu; Scott Margo

(57) ABSTRACT

An electrophoretic display includes an electrophoretic panel, a timing control circuit, a source driver, a gate driver, and a gate line enable circuit. The timing control circuit generates a timing control signal corresponding to a refresh area of a frame according to the refresh area. The gate driver generates output enable signals corresponding to the refresh area according to the timing control signal, and the gate line enable circuit transmits scan signals of first gate lines corresponding to the refresh area to second gate lines corresponding to the refresh area according to the enabled output enable signals. The source driver drives data lines corresponding to the refresh area according to the timing control signal to charge/discharge pixels corresponding to the refresh area.

1 Claim, 12 Drawing Sheets

ELECTROPHORETIC PANEL AND DRIVING METHOD THEREOF

BACKGROUND OF THE INVENTION

1. Field of the Invention

The present invention is related to electrophoretic displays, and particularly to an electrophoretic display that only refreshes image data in a refresh area of an image to reduce image fading and conserve power.

2. Description of the Prior Art

Because electrophoretic panels are bistable, electrophoretic panels only require electricity when refreshing image data. If an electrophoretic panel is not required to refresh image data, power can be turned off, and the electrophoretic panel will continue to display the image data. Please refer to FIG. 1A, FIG. 1B, and FIG. 2. FIG. 1A and FIG. 1B are diagrams of images displayed by electrophoretic panel 100 according to the prior art. FIG. 2 is a diagram illustrating a plurality of gate lines being sequentially enabled and a plurality of data lines all being enabled when electrophoretic panel 100 refreshes from the image of FIG. 1A to the image of FIG. 1B. As shown in FIG. 1A and FIG. 1B, when electrophoretic panel 100 is refreshed from displaying the image of FIG. 1A to the image of FIG. 1B, the entire display of electrophoretic panel 100, including refresh area B and non-refresh area A, is refreshed, i.e. the plurality of gate lines and the plurality of data lines of electrophoretic panel 100 are all enabled sequentially. Thus, electrophoretic panel 100 does not take advantage of its bistable property to save power. Further, as shown in FIG. 2, image data of an image displayed by non-refresh area A of electrophoretic panel 100 all exhibits fading due to common voltage of electrophoretic panel 100 corresponding to non-refresh area A being refreshed.

Thus, in the prior art, electrophoretic display driving methods not only do not take advantage of the bistable property of electrophoretic panels to save power, but images displayed by the electrophoretic panel also exhibit fading.

SUMMARY OF THE INVENTION

According to an embodiment, an electrophoretic display comprises an electrophoretic panel, a timing control circuit, a data driving circuit, a gate driving circuit, and a gate line enabling circuit. The electrophoretic panel comprises a common voltage terminal and a plurality of pixels. The plurality of pixels is coupled to the common voltage terminal. The timing control circuit is for generating a timing control signal corresponding to a refresh area of an image according to the refresh area of the image displayed on the electrophoretic panel. The data driving circuit is coupled to the timing control circuit for receiving the timing control signal, and driving data lines corresponding to M data lines of the refresh area coupled to the data driving circuit according to the timing control signal, where M is a positive integer. The gate driving circuit is coupled to the timing control circuit for outputting scan signals sequentially to N first gate lines coupled to the gate driving circuit, and generating output enable signals corresponding to the refresh area according to the timing control signal. The gate line enabling circuit is coupled to the N first gate lines for transmitting scan signals of the N first gate lines corresponding to the refresh area to second gate lines corresponding to N second gate lines of the refresh area coupled to the gate line enabling circuit according to output enable signals corresponding to the refresh area, where N is a positive integer.

According to an embodiment, a method of driving an electrophoretic display comprises generating a timing control signal corresponding to a refresh area of an image according to the refresh area of the image, outputting scan signals sequentially to N first gate lines coupled to a gate driving circuit, the gate driving circuit generating an output enable signal corresponding to the refresh area according to the timing control signal, transmitting scan signals of the N first gate lines corresponding to the refresh area to a second gate line corresponding to N second gate lines of the refresh area coupled to a gate line enabling circuit according to an output enable signal corresponding to the refresh area, and driving data lines corresponding to M data lines of the refresh area coupled to a data driving circuit to charge/discharge pixels corresponding to the refresh area according to the timing control signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
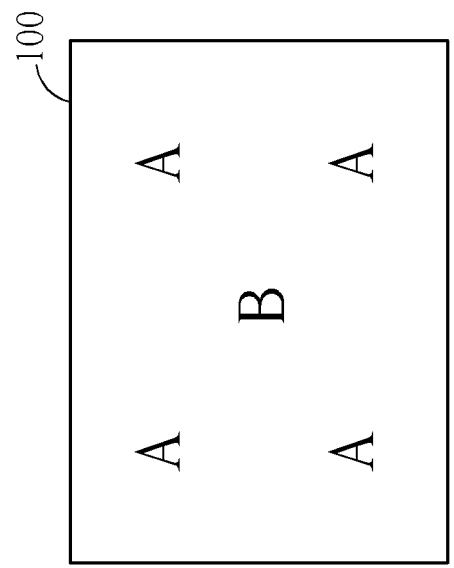
FIG. 1A and FIG. 1B are diagrams of images displayed by electrophoretic panel according to the prior art.
Figure 1B:
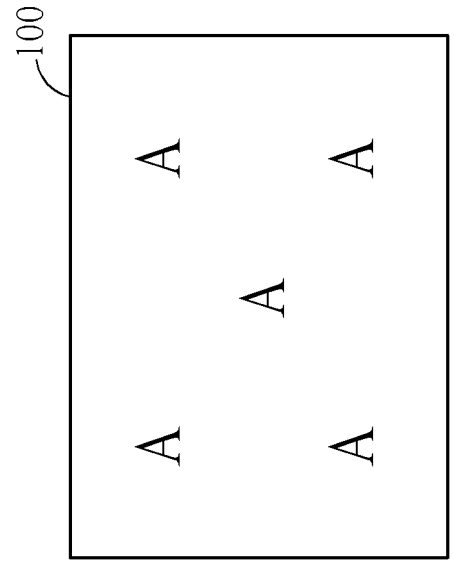
Figure 2:
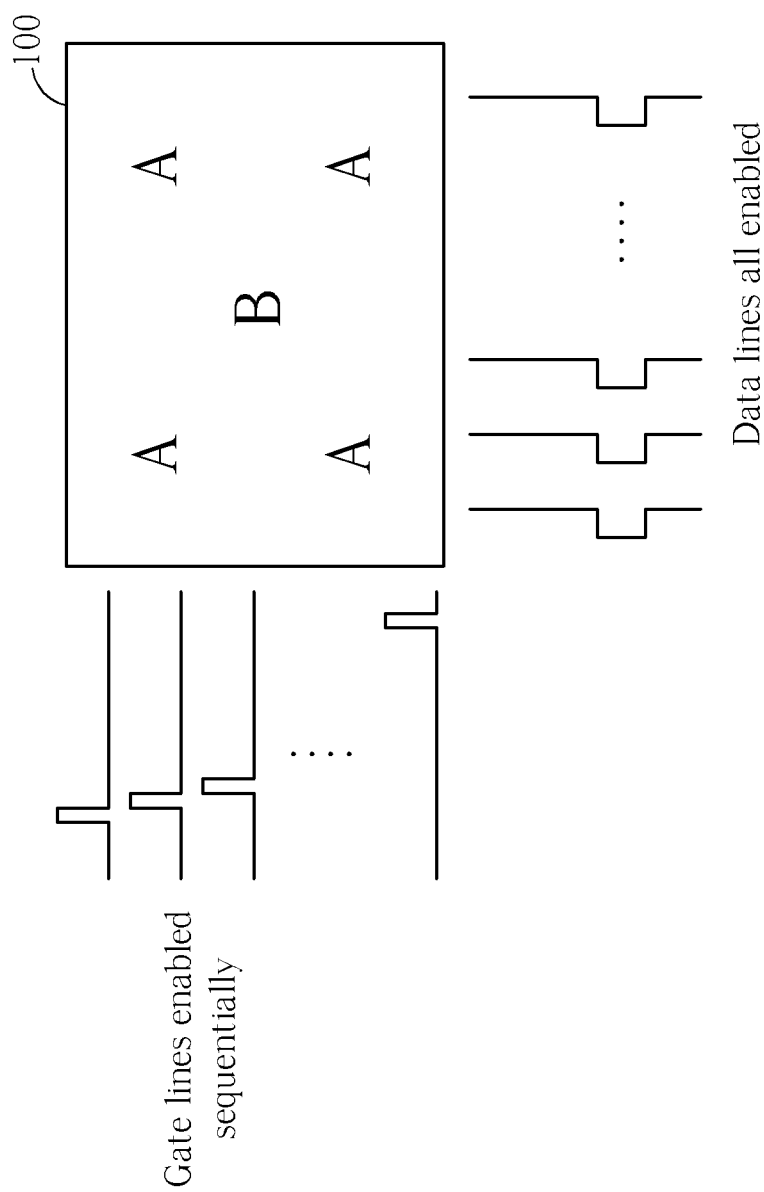
FIG. 2 is a diagram illustrating a plurality of gate lines being sequentially enabled and a plurality of data lines all being enabled when electrophoretic panel refreshes from the image of FIG. 1A to the image of FIG. 1B.
Figure 3:
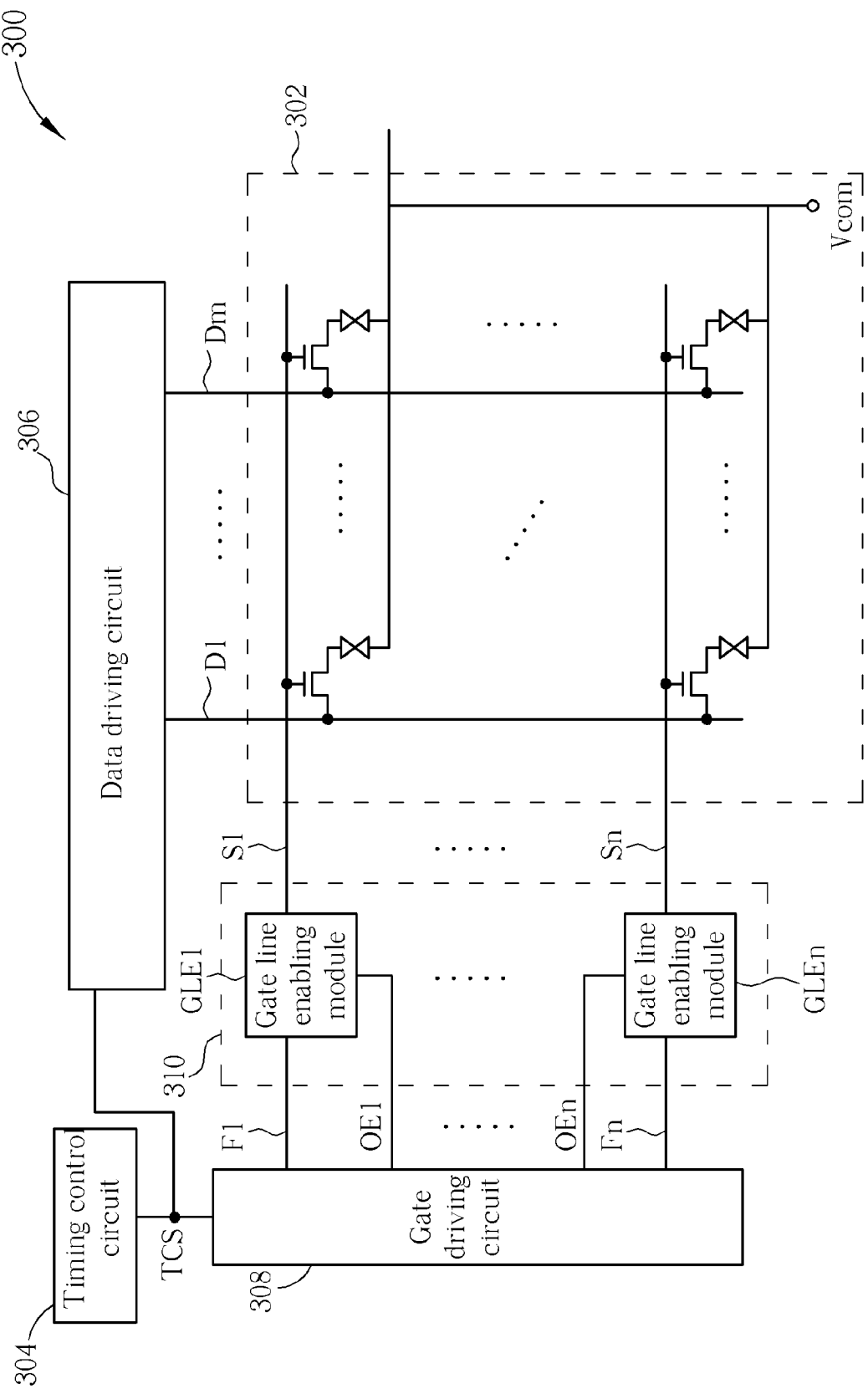
FIG. 3 is a diagram of an electrophoretic display according to an embodiment.

Please refer to FIG. 3, which is a diagram of an electrophoretic display 300 according to an embodiment. Electrophoretic display 300 comprises electrophoretic panel 302, timing control circuit 304, data driving circuit 306, gate driving circuit 308 and gate line enabling circuit 310. Electrophoretic panel 302 comprises common voltage terminal Vcom and a plurality of pixels. Timing control circuit 304 is used for generating timing control signal TCS corresponding to refresh area according to refresh area of an image displayed in electrophoretic panel 302. Data driving circuit 306 is coupled to timing control circuit 304, and is used for receiving timing control signal TCS, and driving data lines of M data lines corresponding to refresh area coupled to data driving circuit 306 according to timing control signal TCS, where M is a positive integer. Gate driving circuit 308 is coupled to timing control circuit 304 for outputting scan signals in sequence to N first gate lines F1-Fn coupled to gate driving circuit 308, and generating output enable signal corresponding to refresh area according to timing control signal TCS, where N is a positive integer. Gate line enabling circuit 310 is coupled to N first gate lines F1-Fn for transmitting scan signals of N first gate lines F1-Fn corresponding to refresh area to second gate lines of N second gate lines S1-Sn coupled to gate line enabling circuit 310 corresponding to refresh area according to output enable signal corresponding to refresh area, where N is a positive integer. Thus, only second gate lines corresponding to refresh area have scan signals. Gate line enabling circuit 310 comprises N gate line enabling modules GLE1-GLEn, where gate line enabling module GLEi is coupled to corresponding first gate line Fi and second gate line Si, and is used for receiving a corresponding output enable signal OEi, where second gate line Si output signal is used for controlling turning on and turning off of switch coupled to pixel, $1 \leq i \leq n$, and I is a positive integer. Further, every gate line enabling module corresponding to refresh area is used for transmitting scan signal of first gate line corresponding to each gate line enabling module to corresponding second gate line according to a corresponding output enable signal. Further, each pixel of plurality of pixels comprised by electrophoretic panel 302 is coupled to common voltage Vcom, and coupled to a corresponding data line and a corresponding second gate line through corresponding switch. In another embodiment, gate driving circuit 308 and gate line enabling circuit 310 are integrated into electrophoretic panel 302.

Figure 4A:
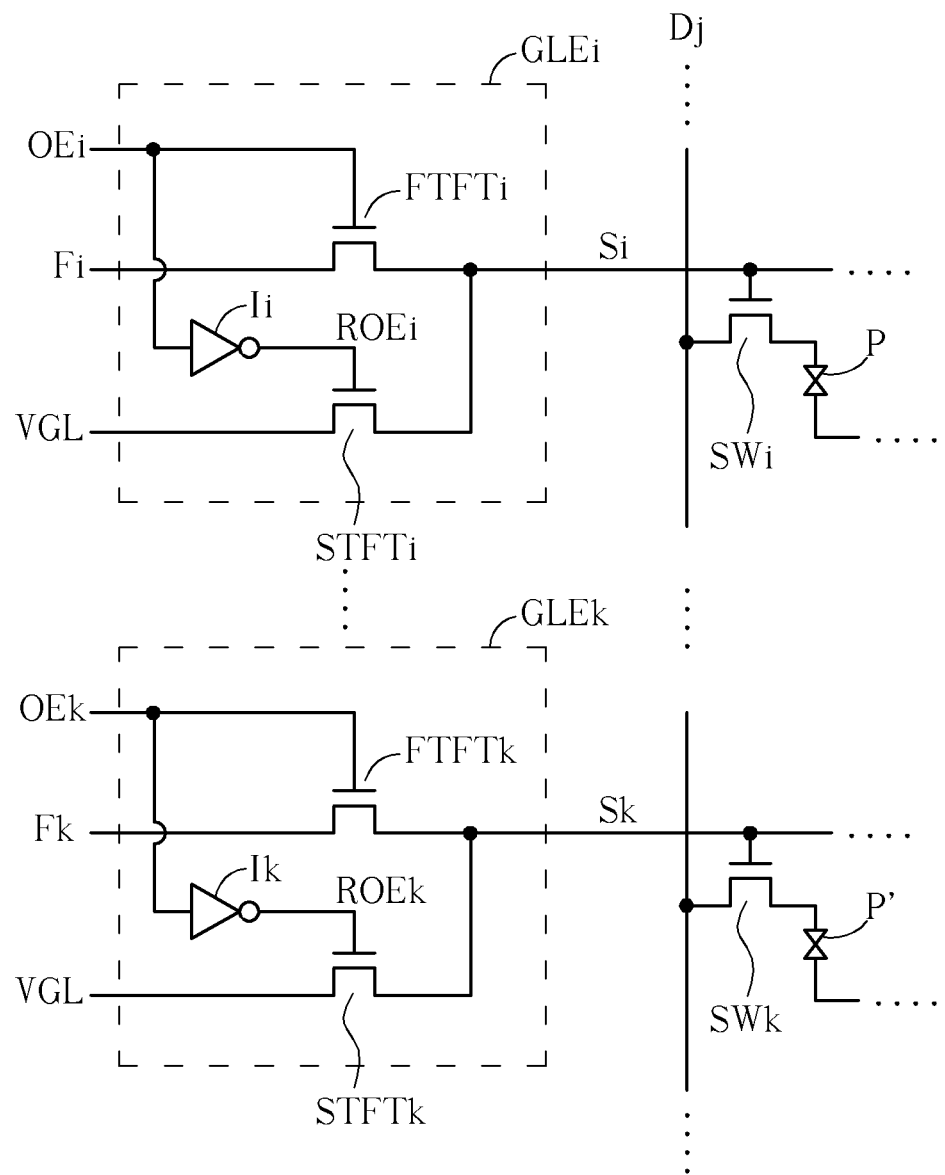
FIG. 4A, FIG. 4B, and FIG. 4C are diagrams illustrating gate line enabling module corresponding to refresh area and gate line enabling module corresponding to non-refresh area.
Figure 4B:
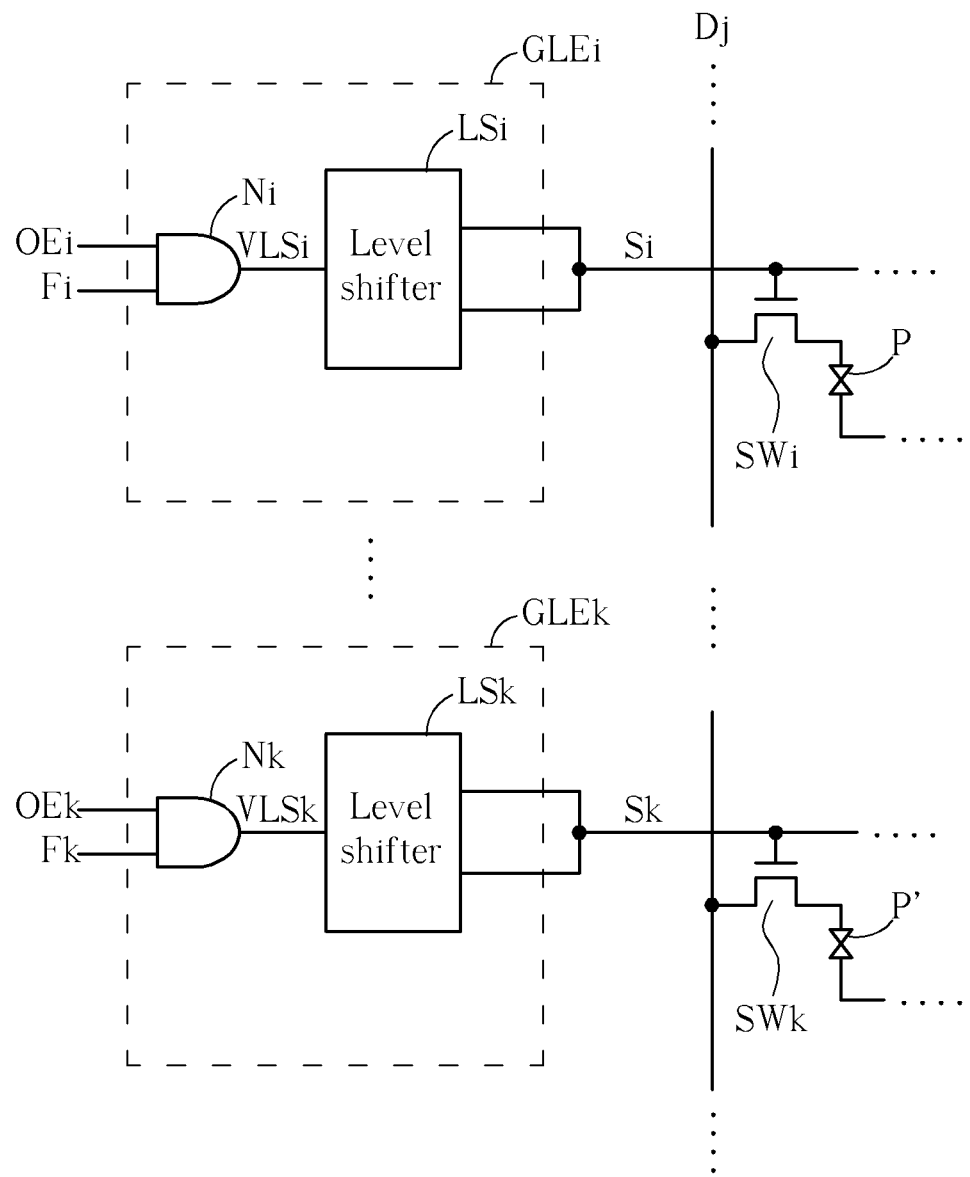
Figure 4C:
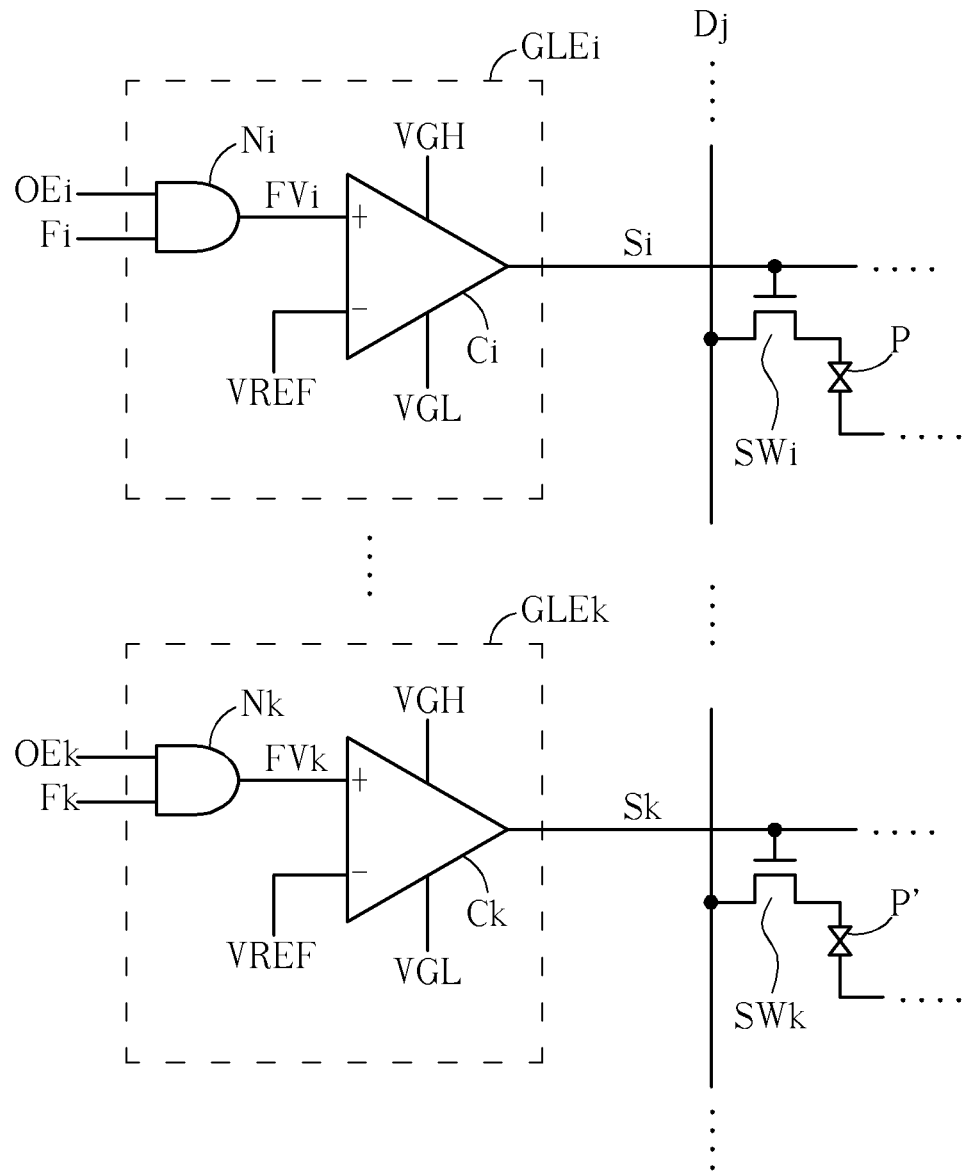
Figure 4D:
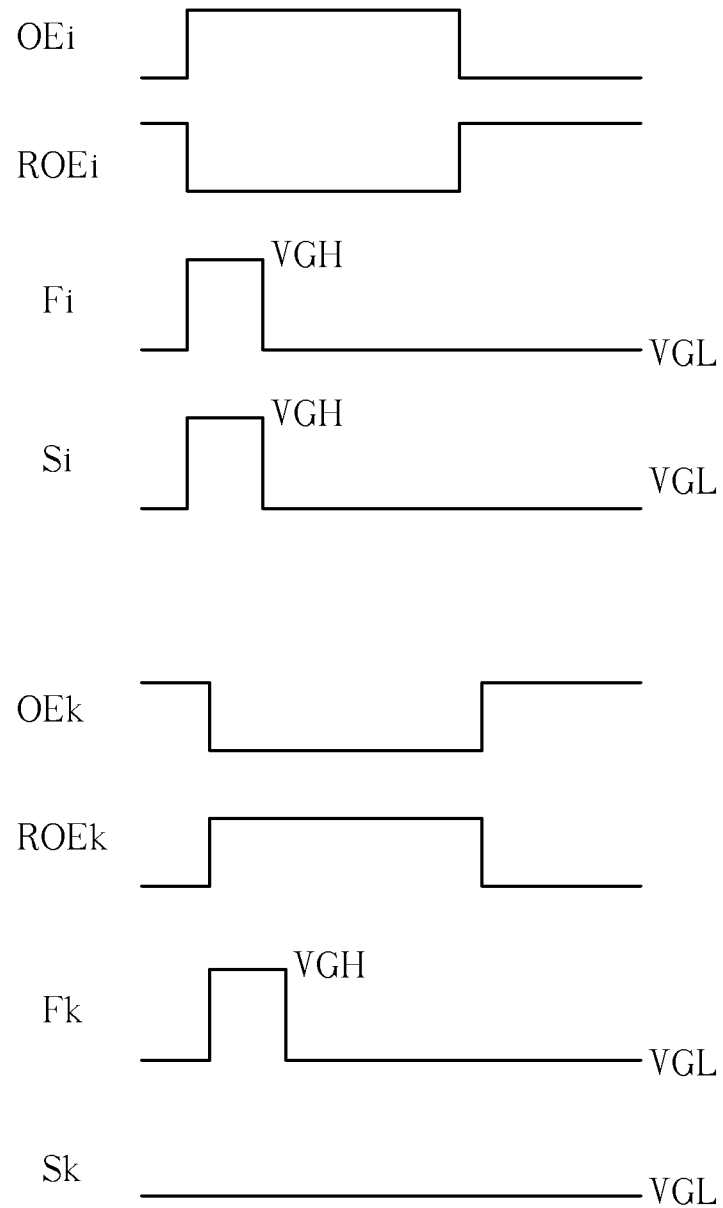
FIG. 4D is a waveform diagram illustrating output enable signal, inverted output enable signal, second gate line, output enable signal, inverted output enable signal, and second gate line.
Figure 4E:
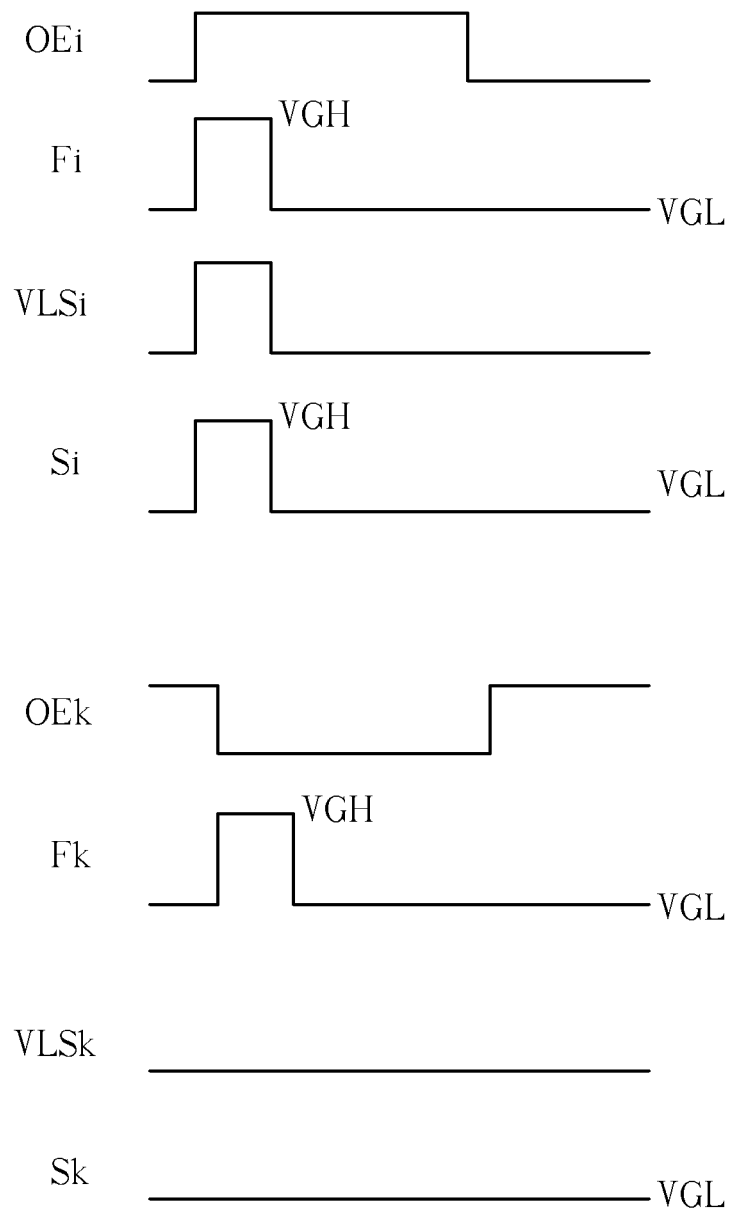
FIG. 4E is a waveform diagram illustrating output enable signal, level shift signal, second gate line, output enable signal, level shift signal, and second gate line.
Figure 4F:
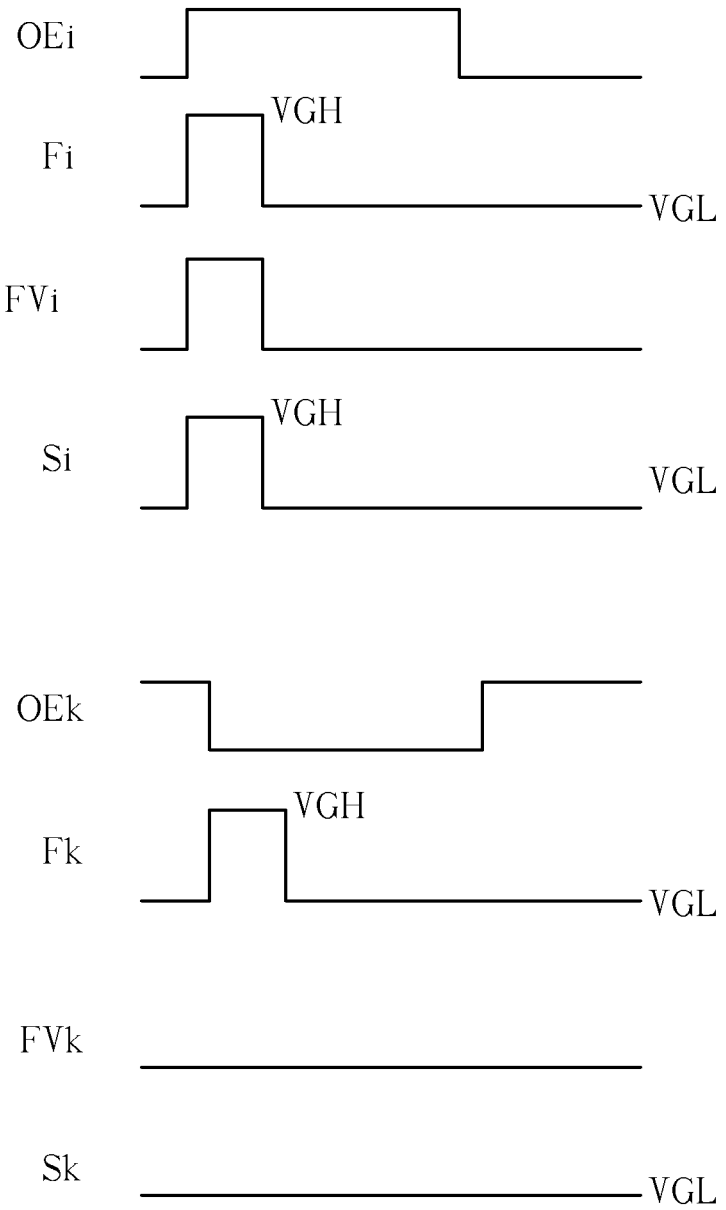
FIG. 4F is a waveform diagram illustrating output enable signal, first voltage, second gate line, output enable signal, first voltage, and second gate line.

Please refer to FIG. 4A, FIG. 4B, FIG. 4C, FIG. 4D, FIG. 4E, and FIG. 4F. FIG. 4A, FIG. 4B, and FIG. 4C are diagrams illustrating gate line enabling module GLEi corresponding to refresh area and gate line enabling module GLEk corresponding to non-refresh area. FIG. 4D is a waveform diagram illustrating output enable signal OEi, inverted output enable signal ROEi, second gate line Si, output enable signal OEk, inverted output enable signal ROEk, and second gate line Sk. FIG. 4E is a waveform diagram illustrating output enable signal OEi, level shift signal VLSi, second gate line Si, output enable signal OEk, level shift signal VLSk, and second gate line Sk. FIG. 4F is a waveform diagram illustrating output enable signal OEi, first voltage FVi, second gate line Si, output enable signal OEk, first voltage FVk, and second gate line Sk. As shown in FIG. 4A, gate line enabling module GLEi comprises first thin-film transistor FTFTi, inverter Ii, and second thin-film transistor STFTi. First thin-film transistor FTFTi has a first terminal for receiving scan signal of first gate line Fi corresponding to gate line enabling module GLEi, a second terminal for receiving output enable signal OEi corresponding to gate line enabling module GLEi, and a third terminal coupled to second gate line Si corresponding to gate line enabling module GLEi. Inverter Ii has a first terminal for receiving output enable signal OEi, and a second terminal for outputting inverted output enable signal ROEi. Second thin-film transistor STFTi has a first terminal for receiving gate low voltage VGL, a second terminal coupled to second terminal of inverter Ii, and a third terminal coupled to third terminal of first thin-film transistor FTFTi. As shown in FIG. 4D, when output enable signal OEi is at high logic voltage "1" (gate driving circuit 308 asserts output enable signal OEi corresponding to refresh area), first thin-film transistor FTFTi turns on, and scan signal (gate high voltage VGH) of first gate line Fi is sent to second gate line Si, where second thin-film transistor STFTi turns off due to inverted output enable signal ROEi (logic low voltage "0") outputted by inverter Ii. Thus, scan signal outputted by second gate line Si can be used to turn on switch SWi coupled to second gate line Si, and data line Dj corresponding to refresh area can perform charging/discharging of pixel P corresponding to data line Dj according to data voltage, where $1 \leq i \leq n$ and $1 \leq j \leq m$. As shown in FIG. 4A, when output enable signal OEk is at logic low voltage "0" (output enable signal OEk corresponding to non-refresh area), first thin-film transistor FTFTk turns off, and second thin-film transistor STFTk turns on due to inverted output enable signal ROEk (logic high voltage "1") outputted by inverter Ik, so that scan signal outputted by second gate line Sk is at gate low voltage VGL, where $1 \leq k \leq n$ and $k \neq i$. Thus, switch SWk coupled to second gate line Sk is off, and pixel P' keeps its original voltage, i.e. specific voltage of pixel P' is not refreshed. First thin-film transistor and second thin-film transistor of FIG. 4A are not limited to being N-type thin-film transistors, but P-type thin-film transistors may also be used with inverted voltage levels of the above-described output enable signal as another embodiment of FIG. 4A.

As shown in FIG. 4B, gate line enabling module GLEi comprises AND gate Ni and level shifter LSi. AND gate Ni has a first terminal for receiving output enable signal OEi corresponding to gate line enabling module GLEi, a second terminal for receiving scan signal of first gate line Fi corresponding to the gate line enabling module GLEi, and an output terminal for outputting level shift signal VLSi. Level shifter LSi has a first terminal for receiving level shift signal VLSi, a second terminal coupled to second gate line Si corresponding to gate line enabling module GLEi for outputting gate high voltage VGH, and a third terminal coupled to second gate line Si for outputting gate low voltage VGL, where level shifter LSi outputs gate high voltage VGH or gate low voltage VGL according to level shift signal VLSi, and $1 \leq i \leq n$. As shown in FIG. 4E, when output enable signal OEi is logic high voltage "1" (gate driving circuit 308 asserts output enable signal OEi corresponding to refresh area) and scan signal of first gate line Fi is at gate high voltage VGH, level shift signal VLSi outputted by AND gate Ni is asserted, causing second terminal of level shifter LSi to output gate high voltage VGH to second gate line Si. As shown in FIG. 4B and FIG. 4E, when output enable signal OEk is at logic low voltage "0" (output enable signal OEk corresponding to non-refresh area), level shift signal VLSk outputted by AND gate Nk is disasserted, causing third terminal of level shifter LSk to output gate low voltage VGL to second gate line Sk, where $1 \leq k \leq n$ and $k \neq i$. Operating principles of data line Dj, pixel P, switch SWi, switch SWk and pixel P' of FIG. 4B are similar to those of data line Dj, pixel P, switch SWi, switch SWk and pixel P' of FIG. 4A, and are not described again here.

As shown in FIG. 4C, gate line enabling module GLEi comprises AND gate Ni and comparator Ci. AND gate Ni has a first terminal for receiving output enable signal OEi corresponding to first gate line Fi of gate line enabling module GLEi, a second terminal for receiving a scan signal corresponding to first gate line Fi of gate line enabling modules GLEi, and an output terminal for outputting first voltage FVi. Comparator Ci has a first terminal for receiving first voltage FVi, a second terminal for receiving reference voltage VREF, a third terminal for receiving gate high voltage VGH, a fourth terminal for receiving gate low voltage VGL, and an output terminal for outputting gate high voltage VGH and gate low voltage VGL, where comparator Ci outputs gate high voltage VGH or gate low voltage VGL according to first voltage FVi and reference voltage VREF, reference voltage VREF is between high voltage (e.g. 3.3V) of first voltage FVi outputted by AND gate Ni and low voltage (e.g. 0V), and $1 \leq i \leq n$. As shown in FIG. 4F, when output enable signal OEi is at logic high voltage "1" (gate driving circuit 308 asserts output enable signal OEi corresponding to refresh area) and scan signal of first gate line Fi is at gate high voltage VGH, first voltage FVi (high voltage) exceeds reference voltage VREF, causing comparator Ci to output gate high voltage VGH to second gate line Si. As shown in FIG. 4C, when output enable signal OEk is at logic low voltage "0" (output enable signal OEk corresponding to non-refresh area), first voltage FVk (low voltage) is lower than reference voltage VREF, causing comparator Ck to output gate low voltage VGL to second gate line Sk, where $1 \leq k \leq n$ and $k \neq i$. Operating principles of data line Dj, pixel P, switch SWi, switch SWk and pixel P' are similar to those of data line Dj, pixel P, switch SWi, switch SWk and pixel P' of FIG. 4A, and are not described again here.

Figure 5:
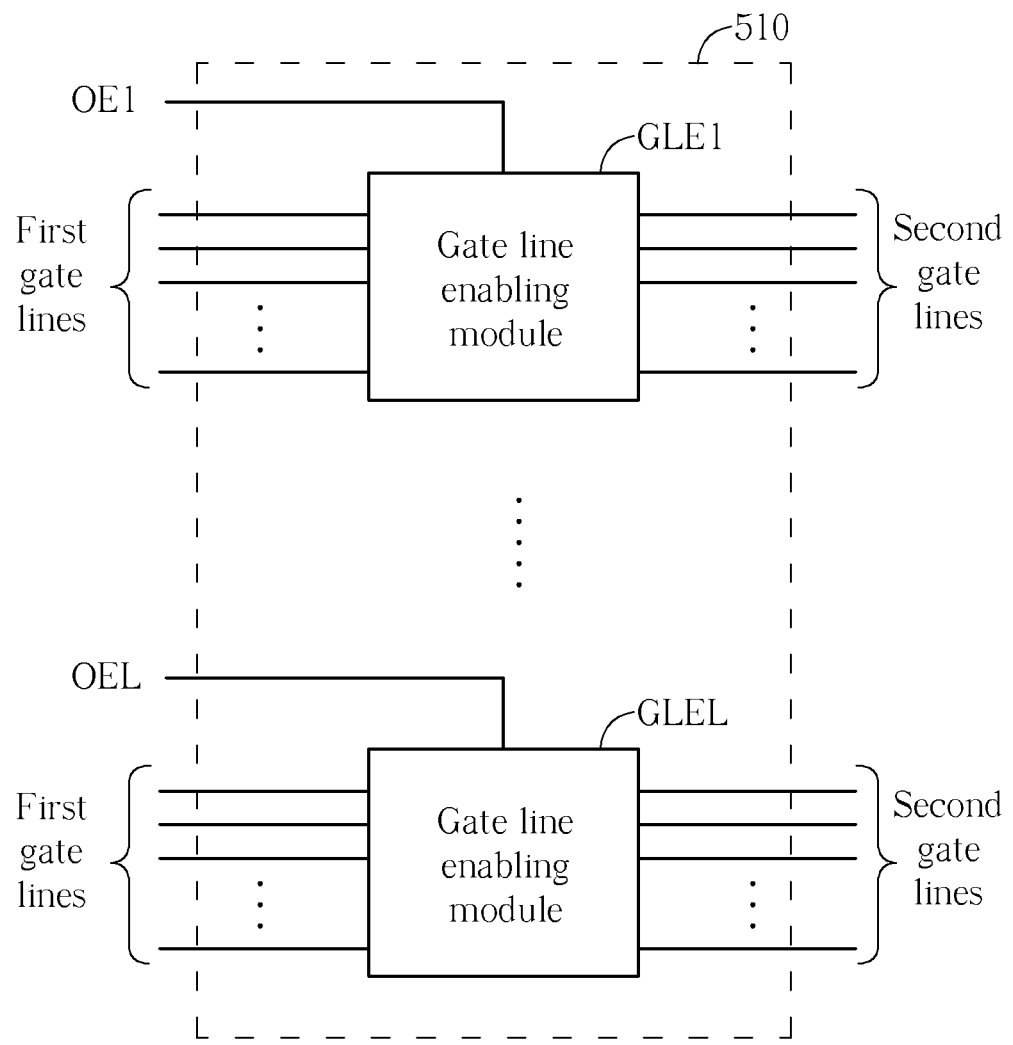
FIG. 5 is a diagram illustrating gate line enabling circuit.

Please refer to FIG. 5, which is a diagram illustrating gate line enabling circuit 510. As shown in FIG. 5, gate line enabling circuit 510 comprises L gate line enabling modules GLE1-GLEL, gate line enabling module GLEi is coupled to corresponding plurality of first gate lines and corresponding plurality of second gate lines, and is used for receiving a corresponding output enable signal. Number of gate lines in the plurality of second gate lines is equal to the number of gate lines in the plurality of first gate lines, and $L<n$. Each gate line enabling module of gate line enabling modules GLE1-GLEL corresponding to refresh area is utilized for transmitting scan signals of a plurality of first gate lines of N first gate lines F1-Fn to a plurality of second gate lines corresponding to the plurality of first gate lines according to a corresponding output enable signal. Scan signal of each second gate line is used for controlling turning on and turning off of switch coupled to one pixel. Other operating principles of gate line enabling circuit 510 are similar to those of gate line enabling circuit 310, and not described again here.

Figure 6:
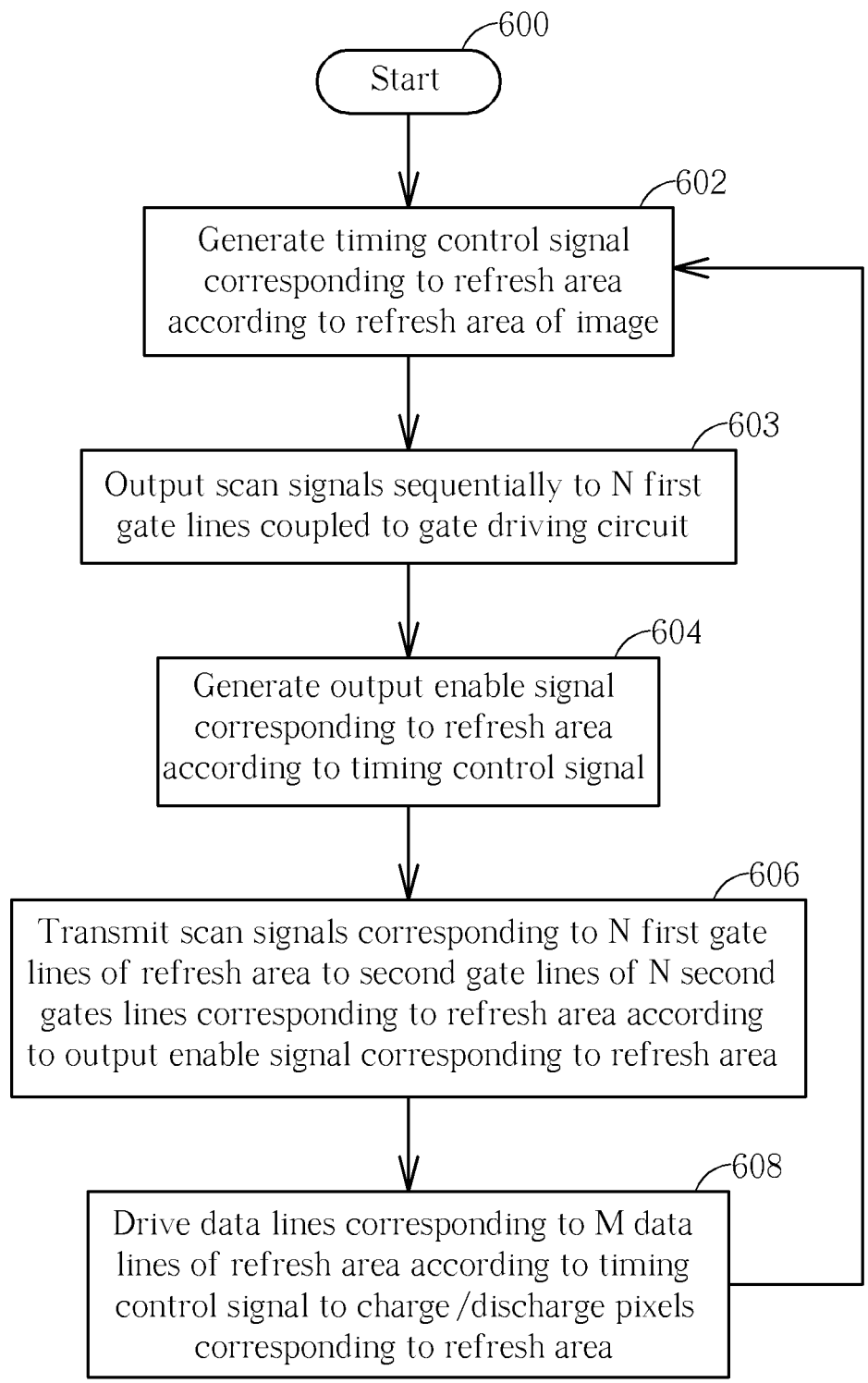
FIG. 6 is a flowchart of a method of performing direct current (DC) voltage to alternating current (AC) voltage conversion according to an embodiment.

Please refer to FIG. 6, which is a flowchart of a method of performing direct current (DC) voltage to alternating current (AC) voltage conversion according to an embodiment. The method of FIG. 6 is described with reference to electrophoretic display 300 of FIG. 3, and comprises the following steps:

Step 600: Start;
Step 602: Generate timing control signal TCS corresponding to refresh area according to refresh area of image;
Step 603: Output scan signals sequentially to N first gate lines F1-Fn coupled to gate driving circuit 308;
Step 604: Generate output enable signal corresponding to refresh area according to timing control signal TCS;
Step 606: Transmit scan signals corresponding to refresh area of N first gate lines to second gate lines of N second gate lines corresponding to refresh area according to output enable signal corresponding to refresh area;
Step 608: Drive data lines corresponding to refresh area of M data lines according to timing control signal TCS to charge/discharge pixels corresponding to refresh area; return to step 602.

In step 602, timing control circuit 304 generates timing control signal TCS corresponding to refresh area according to refresh area of an image displayed on electrophoretic panel 302. In step 604, gate driving circuit 308 generates output enable signal corresponding to refresh area according to timing control signal TCS. In step 606, gate line enabling circuit 310 transmits scan signals of N first gate lines corresponding to refresh area to second gate lines corresponding to N second gate lines of refresh area according to output enable signal corresponding to refresh area. Thus, only second gate lines corresponding to refresh area have scan signal. In step 608, data driving circuit 306 drives data lines corresponding to M data lines of refresh area to charge/discharge pixels corresponding to refresh area according to timing control signal TCS. Thus, in step 608, pixels corresponding to refresh area of electrophoretic panel 302 are refreshed, and pixels of non-refresh area of electrophoretic panel 302 are kept at their original voltages.

Figure 7:
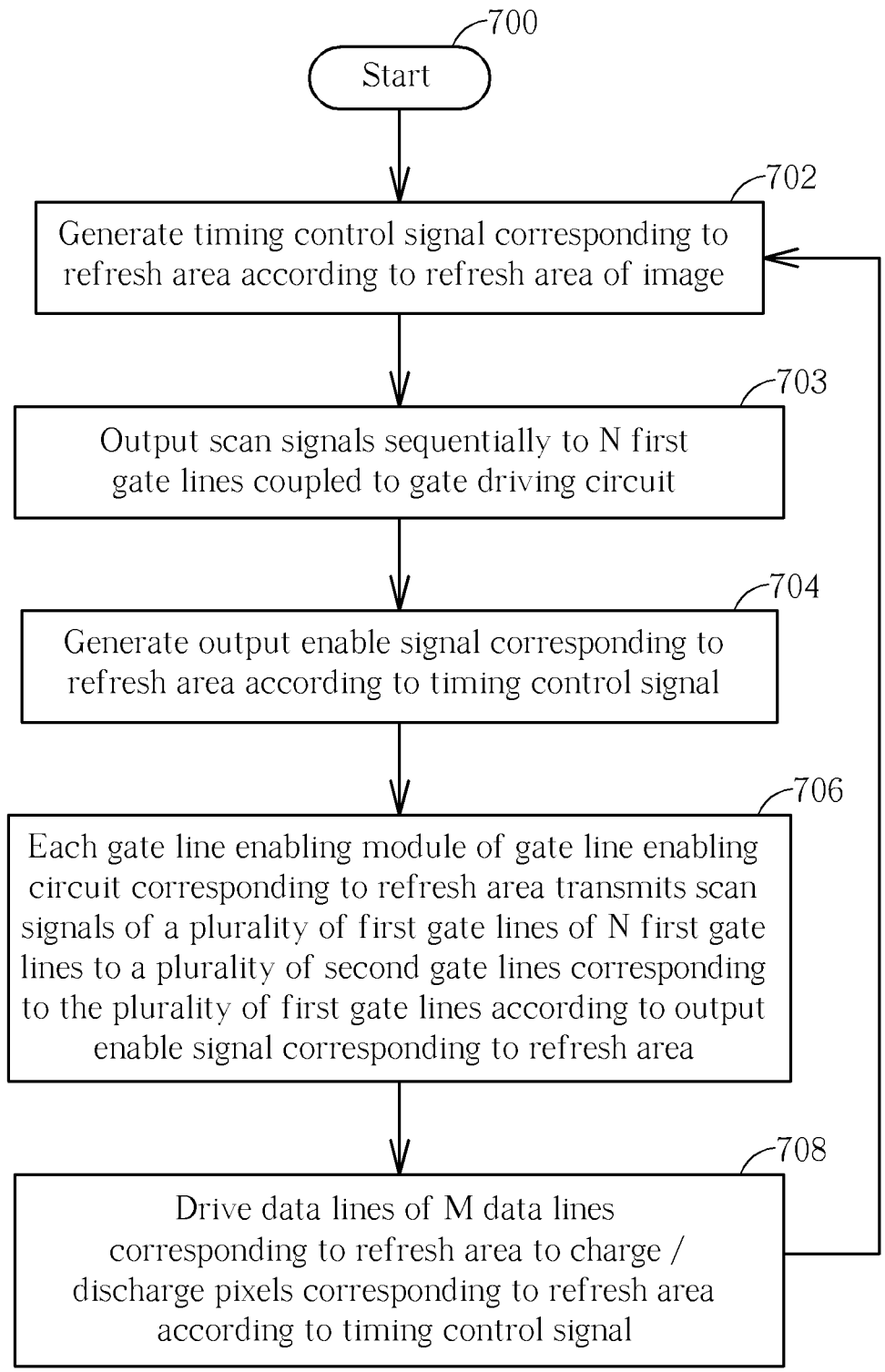
FIG. 7 is a flowchart of a method of performing DC voltage to AC voltage conversion according to an embodiment.

Please refer to FIG. 7, which is a flowchart of a method of performing DC voltage to AC voltage conversion according to an embodiment. The method of FIG. 7 is illustrated with respect to electrophoretic display 300 of FIG. 3 and gate line enabling circuit 510 of FIG. 5, and comprises the following steps:

Step 700: Start;
Step 702: Generate timing control signal TCS corresponding to refresh area according to refresh area of image;
Step 703: Output scan signals sequentially to N first gate lines F1-Fn coupled to gate driving circuit 308;
Step 704: Generate output enable signal corresponding to refresh area according to timing control signal TCS;
Step 706: Each gate line enabling module of gate line enabling circuit 510 corresponding to refresh area transmits scan signals of a plurality of first gate lines of N first gate lines to a plurality of second gate lines corresponding to the plurality of first gate lines according to output enable signal corresponding to refresh area;
Step 708: Drive data lines of M data lines corresponding to refresh area to charge/discharge pixels corresponding to refresh area according to timing control signal TCS; return to step 702.

The embodiment of FIG. 7 is different from the embodiment of FIG. 6 in step 706. All gate line enabling modules of gate line enabling circuit 510 according to a corresponding output enable signal simultaneously transmit scan signals of the plurality of first gate lines of the N first gate lines to the plurality of second gate lines corresponding to the plurality of first gate lines. Other principles of operation of the embodiments shown in FIG. 7 and FIG. 6 are the same, and not described again here.

In summary of the above, the embodiments provide an electrophoretic display and related driving method that utilize timing control circuit to generate timing control signal corresponding to refresh area of electrophoretic panel, utilize data driving circuit to drive data lines corresponding to refresh area according to timing control signal, and utilize gate driving circuit and gate line enabling circuit to transmit scan signals of N first gate lines corresponding to refresh area to second gate lines corresponding to N second gate lines of refresh area coupled to gate line enabling circuit. Thus, pixels corresponding to refresh area of electrophoretic panel are refreshed, and pixels of non-refresh area of electrophoretic panel keep their original voltages. Thus, not only do the embodiments utilize the bistable property of electrophoretic panels to save power, and reduce load on the data driving circuit and gate driving circuit, but they also prevent the problem of color fade exhibited by the prior art.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. An electrophoretic display comprising:
an electrophoretic panel comprising a plurality of pixels and a common voltage terminal, wherein the plurality of pixels are coupled to the common voltage terminal;

a timing control circuit for generating a timing control signal corresponding to a refresh area of an image according to the refresh area of the image to be displayed on the electrophoretic panel;

a data driving circuit coupled to the timing control circuit for receiving the timing control signal, and driving data lines corresponding to M data lines of the refresh area coupled to the data driving circuit according to the timing control signal, wherein M is a positive integer;

a gate driving circuit coupled to the timing control circuit for outputting scan signals sequentially to N first gate lines coupled to the gate driving circuit, and generating output enable signals corresponding to the refresh area according to the timing control signal; and a gate line enabling circuit comprising N gate line enabling modules, each gate line enabling module coupled to one first gate line of the N first gate lines and one second gate line of N second gate lines, and used for receiving a corresponding output enable signal, for transmitting a scan signal of the first gate line corresponding to the refresh area to a second gate line corresponding to the refresh area coupled to the gate line enabling circuit according to the output enable signal corresponding to the refresh area, and the scan signal of the second gate line is used for controlling turning off and turning on of a switch coupled to a pixel, the gate line enabling module comprising:

an AND gate having a first terminal for receiving the output enable signal, a second terminal for receiving the scan signal of the first gate line, and an output terminal for outputting a first voltage; and a comparator having a first terminal for receiving the first voltage, a second terminal for receiving a reference voltage, a third terminal for receiving a gate high voltage, a fourth terminal for receiving a gate low voltage, and an output terminal for outputting the gate high voltage and the gate low voltage;

wherein the comparator outputs the gate high voltage or the gate low voltage according to the first voltage and the reference voltage, and N is a positive integer.

* * * * *